United States Patent [19]

Yamada et al.

[11] Patent Number: 4,965,243
[45] Date of Patent: Oct. 23, 1990

[54] PROCESS FOR PRODUCING A CATALYST FOR PURIFYING EXHAUST GASES FROM INTERNAL COMBUSTION ENGINES

[75] Inventors: Teiji Yamada; Masaki Funabiki, both of Shizuoka, Japan

[73] Assignee: Engelhard Corporation, Edison, N.J.

[21] Appl. No.: 478,040

[22] Filed: Feb. 9, 1990

Related U.S. Application Data

[63] Continuation of Ser. No. 234,226, Aug. 19, 1988, abandoned.

[30] Foreign Application Priority Data

Aug. 28, 1987 [JP] Japan .................................. 62-213159

[51] Int. Cl.$^5$ ....................... B01J 21/04; B01J 21/06; B01J 23/10; B01J 23/58
[52] U.S. Cl. ................... 502/304; 423/213.5
[58] Field of Search ...................... 502/304; 423/213.5

[56] References Cited

U.S. PATENT DOCUMENTS 4,621,071 11/1986 Blanchard et al. ................ 502/302

Primary Examiner—W. J. Shine

[57] ABSTRACT

A three-way catalyst for the purification of automotive exhaust is made by depositing on a monolithic support a slurry containing a platinum group element, active alumina, cerium oxide a barium compound and a zirconium compound and calcining the support.

13 Claims, No Drawings

PROCESS FOR PRODUCING A CATALYST FOR PURIFYING EXHAUST GASES FROM INTERNAL COMBUSTION ENGINES

This is a continuation of co-pending application Ser. No. 07/234,226 filed on Aug. 19, 1988 now abandoned.

DESCRIPTION OF THE INVENTION

1. [Field of Utilization of the Invention]

This invention relates to a catalyst for purifying exhaust gases discharged from internal combustion engines of automobiles, etc., and a process for its production.

More specifically, it relates to a catalyst which shows better exhaust gas purifying ability than conventional catalysts even after it has been exposed for a long period of time to high temperatures (900° to 1100° C.) immediately below the manifold, for example, and to a process for its production.

2. [Prior Art]

Three-way catalysts for simultaneously removing hydrocarbons, carbon monoxide and nitrogen oxides in exhaust gases discharged from internal combustion engines of automobiles, etc. now mainly contain platinum-group elements such as platinum and rhodium and for increasing low-temperature activity, cerium oxide having an oxygen storing effect.

One property required of the present-day catalysts is heat resistance at high temperatures of 900° to 1100° C. This is because the place of installing the catalysts tends to be immediately below the manifold near the engine, and during high speed driving, the temperature of the exhaust gases increases.

However, catalysts containing platinum-group elements or cerium oxide are susceptible to degradation at such high temperatures. The addition of oxides of rare earth metals and alkaline earth metals has heretofore been known as a method of increasing the heat resistance of the catalysts (for example, Japanese Laid-Open Patent Publications Nos. 99988/1975 and 31994/1977). It is also stated that the addition of lanthanum and calcium to inhibit thermal degradation of cerium oxide at high temperatures can result in an increase in the heat resistance of catalysts (for example, Japanese Laid-Open Patent Publications Nos. 631333/1982 and 46247/1986).

Since the temperature of exhaust gases has recently shown a rising tendency as a result of high-speed operation of automobile engines, the catalysts described in the above-cited patent documents do not have sufficient activity after use at high temperatures. It has been desired therefore to develop an excellent catalyst whose activity after use at high temperatures does not decrease so much as in the conventional catalysts.

[OBJECT OF THE INVENTION]

It is an object of this invention to solve the above problems of the prior art, and to provide a catalyst which shows excellent exhaust gas purifying ability even after it has been exposed to high temperatures of 900° to 1100° C. for a long period of time.

[MEANS FOR SOLVING THE PROBLEMS]

The present inventors have made extensive investigations in order to solve the above problems, and have found that a combination of at least one platinum-group metal, active alumina, cerium oxide, a barium compound and a zirconium compound is very effective for maintaining the excellent catalyst activity of an exhaust gas purifying catalyst even after it has been exposed to high temperatures of 900° to 1100° C. This finding has led to the accomplishment of this invention.

The above object is achieved in accordance with this invention by an exhaust gas purifying catalyst comprising a monolithic support and provided thereon, an active layer composed of at least one platinum-group metal, active alumina, cerium oxide, a barium compound and a zirconium compound, and a process for its production.

The present invention will now be described below in detail.

In the present invention, the addition of various barium compounds and zirconium compounds shows an effect of inhibiting sintering of the platinum-group element and cerium oxide and maintains the oxygen storage effect of cerium oxide and produces favorable results in maintaining the activity of the catalyst after it has been used at high temperatures of 900° to 1100° C.

[A] First, the catalyst of this invention will be described.

The exhaust gas purifying catalyst of this invention comprises a monolithic support and being present thereon, at least one platinum-group element, active alumina, cerium oxide, a barium compound and a zirconium compound as catalyst components.

The monolithic support is comprised of a refractory metal oxide or a refractory metal and is, for example, of a honeycomb-like or three-dimensional network structure. The monolithic support may also be a foamed support.

Examples of the refractory metal oxides are cordierite, mullite, alpha-alumina, sillimanite, magnesium silicate, zircon, pentalite, spodumene and aluminosilicates. Examples of the refractory metals are refractory iron-base alloys, refractory nickel-base alloys and refractory chromium-base alloys.

Of these monolithic supports, a honeycomb-shaped support composed of cordierite is most preferably used.

Desirably, platinum and rhodium are contained as the platinum-group element in order to purify CO, HC and $NO_x$ at the same time. The weight of platinum may be any so long as the required catalyst activity is obtained. Usually, it is 0.1 to 10 g, preferably 0.1 to 3 g, per liter of the catalyst. The weight of rhodium may be any so long as the required catalyst activity is obtained. Usually, it is 0.02 to 2 g, preferably 0.02 to 0.7 g, per liter of the catalyst.

Active alumina is preferably gamma-alumina. It desirably has a specific surface area of 10 to 300 $m^2/g$. Its weight is 30 to 200 g, preferably 40 to 120 g, per liter of the catalyst.

Cerium oxide has an oxygen storing effect, and is favorably used to reduce the amount of the platinum-group element used and maintain the same purifying ability. Its weight is usually 10 to 150 g, preferably 10 to 50 g, per liter of the catalyst. Desirably, cerium oxide has a specific surface area of 10 to 300 $m^2/g$.

The barium compound is preferably, barium hydroxide, barium oxide and barium carbonate. Its weight is 0.1 to 20 g, preferably 3 to 15 g, more preferably 5 to 10 g, calculated as barium oxide.

The zirconium compound is preferably zirconium oxide, and its weight is 0.1 to 30 g, preferably 5 to 25 g, more preferably 7 to 20 g, per liter of the catalyst.

[B] The process for producing the exhaust gas purifying catalyst of this invention will be described.

Preparation of active alumina containing the platinum-group element

Active alumina (for example, gamma-alumina) is put in a mixer. The particle diameter of the active alumina is 1 to 100 microns, preferably 1 to 50 microns, more preferably 1 to 30 microns. Part of cerium oxide may be incorporated in the active alumina.

A platinum compound (such as an amine solution of hexahydroxoplatinic acid, or chloroplatinic acid) is added to the active alumina. The platinum compound may be added little by little while gamma-alumina is stirred in the mixer, or it may be added at a time. The platinum compound may be added as a solution (such as an aqueous solution) or a suspension (such as an aqueous suspension). The weight of the platinum compound added may be 1 to 100 g calculated as platinum, or 100 to 500 ml as a solution of the platinum compound, per kilogram of the active alumina.

A rhodium compound (such as rhodium nitrate or rhodium chloride) may be added little by little or at a time to a mixture containing the active alumina and the platinum compound. The rhodium compound may be added as a solution or suspension. The weight of the rhodium compound added may be 0.2 to 50 g calculated as rhodium, or 100 to 500 ml as a solution of the rhodium compound, per liter of the active alumina.

Subsequently, a solution of acetic acid, preferably a 10–40% by weight aqueous solution of acetic acid, is added to a mixture containing the platinum compound and the active alumina. The acetic acid solution is preferably added little by little while the mixture is stirred in the mixer. The amount of acetic acid added may be 100 to 300 ml per kilogram of active alumina.

Preparation of a slurry

Active alumina containing the platinum-group elements obtained by the above method, cerium oxide, the barium compound, the zirconium compound, acetic acid and deionized water were introduced into a mill and pulverized to form a slurry. The weight of cerium is 50 to 500 g, preferably 150 to 400 g, per kilogram of active alumina.

The barium compound is preferably barium hydroxide, barium acetate or barium oxide. Its weight is 1.0 to 310 g, preferably 45 to 225 g, more preferably 60 to 150 g.

The zirconium compound is preferably zirconyl acetate or zirconyl hydroxide. Its weight is 1.0 to 430 g, preferably 70 to 350 g, more preferably 100 to 290 g, per kilogram of the active alumina calculated as zirconium oxide.

Acetic acid is used preferably in an amount of 50 to 300 ml per kilogram of the active alumina as a 60-90 wt.% aqueous solution. The amount of deionized water may be 50 to 1000 ml per kilogram of the active alumina.

By the above pulverization in the mill, the average particle diameter of the mixture in the slurry can be adjusted to 0.1 to 10 microns, preferably 1 to 5 microns.

The resulting slurry was transferred to a vessel, and deionized water was added to form a slurry having a predetermined specific gravity which may, for example, be 1.20 to 1.85 g/ml.

Deposition of the slurry on a monolithic support

The slurry is deposited on a monolithic support which is described in section [A] above.

The slurry is deposited on the monolithic support for a period of, for example, 1 to 60 seconds, preferably 3 to 10 seconds, and then the excess of the slurry in the cells is removed by an air blow. Then, the support having the slurry deposited thereon is dried with hot air preferably at a temperature of 20° to 100° C. to remove at least 50%, preferably at least 90%, of water. After removing the water, the support may be calcined at a temperature of 200° to 900° C., preferably 300° to 800° C., for 10 minutes to 10 hours, preferably 15 to 60 minutes, in air, for example. When the temperature of the support is to be gradually raised in calcination, the above drying (removal of water) may be omitted.

By the above slurry deposition step, there can be deposited 30 to 200 g, for example, of alumina containing platinum and rhodium, 10 to 150 g of cerium oxide, 0.1 to 20 g of the barium compound calculated as barium oxide, and 0.1 to 30 g of the zirconium compound calculated as zirconium oxide.

[EXAMPLES]

The following examples illustrate the present invention in more detail.

EXAMPLE 1

(a) Active alumina (1.2 kg) having a BET specific surface area of 150 $m^2/g$ and an average particle diameter of 30 microns was put in a mixer, and with stirring, 300 ml of an aqueous amine solution of hexahydroxoplatinic acid containing 20.4 g of platinum was added dropwise little by little and dispersed uniformly. Subsequently, 150 ml of an aqueous solution of rhodium nitrate containing 4.1 g of rhodium was added dropwise little by little and uniformly dispersed.

Finally, 100 ml of 25% by weight acetic acid was added little by little and uniformly dispersed to prepare an alumina powder (Pt/Rh=5/1) containing platinum and rhodium.

(b) The alumina containing platinum and rhodium obtained in step (b) (532 g as the dry weight), 304 g of cerium oxide having an average particle diameter of 15 microns, 117 g of barium hydroxide octahydrate (57 g calculated as barium oxide), 535 g (107 g calculated as zirconium oxide), 71 ml of 90% by weight acetic acid and 100 ml of deionized water were put in a mill and pulverized and mixed to form an alumina slurry. The pulverizing time was such that at least 90% of the particles in the slurry had a particle diameter of not more than 9.0 microns.

(c) Deionized water was addd to the slurry obtained in step (b) to adjust its specific gravity to 1.66 g/ml to form a diluted slurry. A cylindrical monolithic carrier of cordierite (volume 1.0 liters, 300 cells/$in^2$) having a length of 147.5 mm in length and 93 mm in diameter was immersed for 5 seconds in the diluted slurry, withdrawn from the diluted slurry, and then subjected to an air blow to remove the excess of the slurry. It was further dried at 30° to 60° C., and then calcined at 500° C. for 30 minutes to obtain a catalyst A.

The catalyst A obtained by a series of steps (a), (b) and (c) contained 1.4 g of platinum and rhodium, 70 g of alumina, 40 g of cerium oxide, 7.5 g, calculated as barium oxide, of the barium compound and 14 g of zirconium oxide per liter of the finished catalyst.

COMPARATIVE EXAMPLE 1

A catalyst B was prepared in the same way as in Example 1 except that barium hydroxide and zirconyl acetate were not added in step (b).

COMPARATIVE EXAMPLE 2

A catalyst C was prepared in the same way as in Example 1 except that in step (b), zirconyl acetate was not added.

COMPARATIVE EXAMPLE 3

A catalyst D was prepared in the same way as in Example 1 except that in step (b), barium hydroxide was not added.

COMPARATIVE EXAMPLE 4

A catalyst E was prepared in the same way as in Example 1 except that in step (b), cerium oxide was not added.

EXAMPLE 2

A catalyst F was prepared in the same way as in Example 1 except that in step (b), barium oxide in the same amount calculated as barium oxide was used instead of barium hydroxide.

EXAMPLE 3

A catalyst G was prepared in the same way as in Example 1 except that in step (b), the amount of the barium hydroxide was changed to 83 g from 117 g. The catalyst G contained 5.3 g of the barium compound calculated as barium oxide per liter of the finished catalyst.

EXAMPLE 4

A catalyst H was prepared in the same way as in Example 1 except that in step (b), the amount of the barium hydroxide added was changed to 156 g from 117 g. The catalyst H contained 10 g of the barium compound calculated as barium oxide per liter of the finished catalyst.

EXAMPLE 5

A catalyst I was prepared in the same way as in Example 1 except that in step (b), the amount of the barium hydroxide added was changed to 55 g from 117 g. The catalyst I contained 3.5 g of the barium compound calculated as barium oxide per liter of the finished catalyst.

EXAMPLE 6

A catalyst J was prepared in the same way as in Example 1 except that in step (b), zirconyl hydroxide in nearly the same amount calculated aa zirconium oxide was used instead of zirconyl acetate.

EXAMPLE 7

A catalyst K containing 20 g of zirconium oxide per liter of the finished catalyst was prepared in the same way as in Example 1 except that in step (b), the amount of zirconyl acetate added was changed to 764 g from 535 g.

EXAMPLE 8

A catalyst L containing 7 g of zirconium oxide per liter of the finished catalyst was prepared in the same way as in Example 1 except that in step (b), the amount of zirconyl acetate added was changed to 268 g from 535 g.

EXAMPLE 9

A catalyst M containing 25 g of cerium oxide per liter of the finished catalyst was prepared in the same way as in Example 1 except that in step (b), the amount of cerium oxide added was changed to 190 g from 304 g.

EXAMPLE 10

A catalyst N containing 55 g of cerium oxide per liter of the finished catalyst was prepared in the same way as in Example 1 except that in step (b), the amount of cerium oxide added was changed to 418 g from 304 g.

TEST EXAMPLE 1

The catalysts (sample designations A to N) obtained in Examples 1 to 10 and Comparative Examples 1 to 4 were each subjected to a durability test by the following method, and their catalytic performances were evaluated.

Durability test

Each of the catalysts was filled into a stainless steel multiconverter. Under the following conditions, an exhaust gas was passed through the multiconverter for 50 hours.

Air-fuel ratio (A/F): 16.2
Temperature of the catalyst bed 950° C.
Fuel: Gasoline (lead-free)
Test for evaluating catalytic performance The performance of each catalyst was evaluated by filling the catalyst into the same multiconverter as above fitted with a sampling tube, and analyzing inlet and outlet gas components by means of MEXA 8120 (made by Horiba Seisakusho). An exhaust gas was used, and the test was carried out under the following conditions.

Air-fuel ratio: 14.55, 14.7, 14.85 ( A/F= ±0.5)
Space velocity (SV): 133,000 hr$^{-1}$
Temperatre at the inlet of the catalyst: 500° C.
Frequency: 2.0 Hz The ratio of purifying the components (CO, HC, $NO_x$) are shown by average values of the purification ratios at each of the above A/F ratios.

The results are shown in Tables 1 to 6.

Table 1 shows that the catalyst A containing cerium oxide, the barium compound and the zirconium compound simultaneously had excellent purifying ability even after the high temperature durability test at 950° C.; but that absent at least one of these additives, the purifying ability of the catalyst after the high temperature durability test at 950° C. was markedly decreased.

Table 2 shows that when the barium compound, irrespective of its type, was present together with the other additives (cerium oxide and the zirconium compound), excellent purifying ability was manifested after the high-temperature durability test.

Table 3 shows that the effect of adding the barium compound was noted even when its amount was small, but the optimum range of its amount is 0.1 to 20 g/liter, preferably 3.0 to 15.0/liter, more preferably 5.0 to 10 g/liter, calculated as barium oxide.

Table 4 shows that when the zirconium compound, irrespective of its type, was present together with the other additives (cerium oxide and the barium compound), excellent purifying ability was manifested after the high-temperature durability test.

Table 5 shows that the effect of adding the zirconium compound was noted even when its amount was small, but the optimum range of its amount is 0.1 to 30 g/liter, preferably 5.0 to 25.0 g/liter, more preferably 7.0 to 20 g/liter, calculated as zirconium oxide.

Table 6 shows that the optimum range of the amount of cerium oxide added is 10 to 150 g/liter, preferably 10 to 50 g/liter.

TEST EXAMPLE 2

The crystallite size of cerium oxide in each of the catalysts after the durability test was determined by using an X-ray diffraction device (RAD-IIVB made by Rigaku Denki Co., Ltd.), and the extent of thermal degradation of cerium oxide was evaluated. When thermal degradation proceeds, the crystallite size of cerium oxide gradually increases and its oxygen storing effect decreases. Hence, the activity of the catalyst is reduced.

Table 7 shows that the extent of thermal degradation of cerium oxide was markedly inhibited in the catalyst containing the barium compound and the zirconium compound simultaneously. [Effects of the Invention]

As stated hereinabove, by the presence of the platinum-group element, active alumina, cerium oxide, the barium compound and the zirconium compound as active ingredients on the monolithic support, thermal degradation of cerium oxide in the catalyst of this invention was markedly inhibited as compared with that in conventional catalysts. When the activity of the catalyst of this invention after the high-temperature durability test at 950° C. is evaluated in terms of the purifying ratios of the regulated substances at a normally used temperature (500° C.), the catalyst of this invention can increase the purifying ratio of carbon monoxide by 10 to 15%, the purifying ratio of hydrocarbons by 3 to 7% and the purifying ratio of nitrogen oxides by 10 to 15%.

[Explanation of Tables]

Table 1: Comparison of the effects of the additives on the purifying abilities of the catalysts after the high-temperature durability test at 950° C.

Table 2: Comparison of the effects of the type of the barium compound added on the purifying abilities of the catalysts after the high-temperature durability test at 950° C.

Table 3: Comparison of the effects of the amount of the barium compound added on the purifying abilities of the catalysts after the high-temperature durability test at 950° C.

Table 4: Comparison of the effects of the type of the zirconium compound added on the purifying abilities of the catalysts after the high-temperature durability test at 950° C.

Table 5: Comparison of the effects of the amount of the zirconium compound added on the purifying abilities of the catalysts after the high-temperature durability test at 950° C.

Table 6: Comparison of the effects of the amount of cerium oxide added on the purifying abilities of the catalysts after the high-temperature durability test at 950° C.

Table 7: Comparison of the crystallite sizes of cerium oxide in the catalysts after the high-temperature durability test at 950° C. with regard to the effect of the additives on the inhibition of thermal degradation of cerium oxide.

TABLE 1

| Run No. | Sample | Amount of cerium oxide added (g/liter) | Amount of barium hydroxide added (g/liter, as BaO) | Amount of zirconyl acetate added (g/liter, as $ZrO_2$) | Purifying ratio | | |
|---|---|---|---|---|---|---|---|
| | | | | | CO | HC | $NO_x$ |
| Ex. 1 | A | 40 | 7.5 | 14 | 82 | 80 | 73 |
| CEx. 1 | B | 40 | none | none | 63 | 75 | 64 |
| CEx. 2 | C | 40 | 7.5 | none | 74 | 77 | 69 |
| CEx. 3 | D | 40 | none | 14 | 71 | 77 | 66 |
| CEx. 4 | E | none | 7.5 | 14 | 61 | 73 | 58 |

*1: On all samples, the results were obtained by evaluation after performing the durability test at 950° C. for 50 hours.
*2: In all samples, the Pt/Rh ratio was constant at 5/1, and the amount of each platinum-group element was constant at 1.4 g/liter. The number of cells was constant at 300 cpi$^2$.
*3: Conditions for evaluating purifying ability
A/F ratio: 14.55, 14.70, 14.85 (ΔA/F = 0.5)
SV: 133,000 h$^{-1}$
Temperature at the inlet of the catalyst: 500° C.
Frequency: 2.0 Hz
Purifying ratio (%): average value of the purifying ratios at each of the above A/F ratios In all tables, "Ex." stands for Example, and "CEx.", Comparative Example.

TABLE 2

| Run No. | Sample | Type of the barium compound added | Purifying ratio | | |
|---|---|---|---|---|---|
| | | | CO | HC | $NO_x$ |
| Ex. 1 | A | Barium hydroxide | 82 | 80 | 73 |
| Ex. 2 | F | Barium oxide | 78 | 78 | 73 |
| CEx. 3 | D | none | 71 | 77 | 66 |

*1: The amount of the barium compound added was constant at 7.5 g/liter calculated as barium oxide.
*2: Additives other than the barium compound were cerium oxide and zirconyl acetate. The amount of cerium oxide was constant at 40 g/liter, and the amount of zirconyl acetate, at 14 g/liter calculated as zirconium oxide.
*3: On all samples, the results were obtained by evaluation after the durability test was carried out at 950° C. for 50 hours.
*4: In all samples, the Pt/Rh ratio was constant at 5/1, and the amount of each platinum-group element was constant at 1.4 g/liter. The number of cells was constant at 300 cpi$^2$.
*5: Conditions for evaluating purifying ability
A/F ratio: 14.55, 14.70, 14.85 (ΔA/F = 0.5)
SV: 133,000 h$^{-1}$
Temperature at the inlet of the catalyst: 500° C.
Frequency: 2.0 Hz
Purifying ratio (%): average value of the purifying ratios at each of the above A/F ratios

TABLE 3

| Run No. | Sample | Amount of the barium compound added (g/liter) | Purifying ratio | | |
|---|---|---|---|---|---|
| | | | CO | HC | $NO_x$ |
| Ex. 1 | A | 7.5 | 82 | 80 | 73 |
| Ex. 3 | G | 5.3 | 79 | 80 | 72 |
| Ex. 4 | H | 10.0 | 83 | 80 | 75 |
| Ex. 5 | I | 3.5 | 78 | 79 | 72 |

TABLE 3-continued

| Run No. | Sample | Amount of the barium compound added (g/liter) | Purifying ratio CO | HC | NO$_x$ |
|---|---|---|---|---|---|
| CEx. 3 | D | none | 71 | 77 | 66 |

*1: The barium compound added was barium hydroxide and its amount was calculated as barium oxide.
*2: Additives other than the barium compound were cerium oxide and zirconyl acetate. The amount of cerium oxide was constant at 40 g/liter, and the amount of zirconyl acetate, at 14 g/liter calculated as zirconium oxide.
*3: On all samples, the results were obtained by evaluation after the durability test was carried out at 950° C. for 50 hours.
*4: In all samples, the Pt/Rh ratio was constant at 5/1, and the amount of each platinum-group element was constant at 1.4 g/liter. The number of cells was constant at 300 cpi$^2$.
*5: Conditions for evaluating purifying ability
A/F ratio: 14.55, 14.70, 14.85 (ΔA/F = 0.5)
SV: 133,000 h$^{-1}$
Temperature at the inlet of the catalyst: 500° C.
Frequency: 2.0 Hz
Purifying ratio (%): average value of the purifying ratios at each of the above A/F ratios

TABLE 4

| Run No. | Sample | Type of the zirconium compound added | Purifying ratio CO | HC | NO$_x$ |
|---|---|---|---|---|---|
| Ex. 1 | A | Zirconyl acetate | 82 | 80 | 73 |
| Ex. 6 | J | Zirconyl hydroxide | 80 | 79 | 71 |
| CEx. 2 | C | none | 74 | 77 | 69 |

*1: The amount of the zirconium compound added was constant at 14 g/liter calculated as zirconium oxide.
*2: Additives other than the zirconium compound were cerium oxide and barium hydroxide. The amount of cerium oxide was constant at 40 g/liter, and the amount of barium hydroxide, at 7.5 g/liter calculated as barium oxide.
*3: On all samples, the results were obtained by evaluation after the durability test was carried out at 950° C. for 50 hours.
*4: In all samples, the Pt/Rh ratio was constant at 5/1, and the amount of each platinum-group element was constant at 1.4 g/liter. The number of cells was constant at 300 cpi$^2$.
*5: Conditions for evaluating purifying ability
A/F ratio: 14.55, 14.70, 14.85 (ΔA/F = 0.5)
SV: 133,000 h$^{-1}$
Temperature at the inlet of the catalyst: 500° C.
Frequency: 2.0 Hz
Purifying ratio (%): average value of the purifying ratios at each of the above A/F ratios

TABLE 5

| Run No. | Sample | Amount of the zirconium compound added (g/liter) | Purifying ratio CO | HC | NO$_x$ |
|---|---|---|---|---|---|
| Ex. 1 | A | 14 | 82 | 80 | 73 |
| Ex. 7 | K | 20 | 83 | 80 | 75 |
| Ex. 8 | L | 7 | 79 | 79 | 72 |
| CEx. 2 | C | none | 74 | 77 | 69 |

*1: The zirconium compound added was zirconyl acetate, and its amount was calculated as zirconium oxide.
*2: Additives other than the zirconium compound were cerium oxide and barium hydroxide. The amount of cerium oxide was constant at 40 g/liter, and the amount of barium hydroxide, at 7.5 g/liter calculated as barium oxide.
*3: On all samples, the results were obtained by evaluation after the durability test was carried out at 950° C. for 50 hours.
*4: In all samples, the Pt/Rh ratio was constant at 5/1, and the amount of each platinum-group element was constant at 1.4 g/liter. The number of cells was constant at 300 cpi$^2$.
*5: Conditions for evaluating purifying ability
A/F ratio: 14.55, 14.70, 14.85 (ΔA/F = 0.5)
SV: 133,000 h$^{-1}$
Temperature at the inlet of the catalyst: 500° C.
Frequency: 2.0 Hz
Purifying ratio (%): average value of the purifying ratios at each of the above A/F ratios

TABLE 6

| Run No. | Sample | Amount of cerium oxide added (g/liter) | Purifying ratio CO | HC | NO$_x$ |
|---|---|---|---|---|---|
| Ex. 1 | A | 40 | 82 | 80 | 73 |
| Ex. 9 | M | 25 | 79 | 80 | 72 |
| Ex. 10 | N | 55 | 83 | 80 | 75 |
| CEx. 4 | E | none | 61 | 73 | 58 |

*1: Additives other than cerium oxide were barium hydroxide, and zirconyl acetate. The amount of barium hydroxide was constant at 7.5 g/liter calculated as barium oxide, and the amount of zirconyl acetate, at 14 g/liter calculated as zirconium oxide.
*2: On all samples, the results were obtained by evaluation after the durability test was carried out at 950° C. for 50 hours.
*3: In all samples, the Pt/Rh ratio was constant at 5/1, and the amount of each platinum-group element was constant at 1.4 g/liter. The number of cells was constant at 300 cpi$^2$.
*4: Conditions for evaluating purifying ability
A/F ratio: 14.55, 14.70, 14.85 (ΔA/F = 0.5)
SV: 133,000 h$^{-1}$
Temperature at the inlet of the catalyst: 500° C.
Frequency: 2.0 Hz
Purifying ratio (%): average value of the purifying ratios at each of the above A/F ratios

TABLE 7

| Run No. | Sample | Amount of cerium oxide added (g/liter) | Amount of barium hydroxide added (g/liter, as BaO) | Amount of zirconyl acetate added (g/liter, as ZrO$_2$) | Crystallite size of cerium oxide (Å) |
|---|---|---|---|---|---|
| Ex. 1 | A | 40 | 7.5 | 14 | 246 |
| CEx. 1 | B | 40 | none | none | 452 |
| CEx. 2 | C | 40 | 7.5 | none | 302 |
| CEx. 3 | D | 40 | none | 14 | 315 |

*1: The crystallite size of cerium oxide is a value obtained by calculation on the basis of the Scherrer's equation in accordance with an X-ray diffraction method.
*2: On all samples, the results were obtained by evaluation after the durability test at 950° C. for 50 hours.
*3: The crystallite size of cerium oxide in the fresh catalyst not subjected to the high-temperature durability test in each run was 80 to 90 Å.
*4: In all samples, the Pt/Rh ratio was constant at 5/1, and the amount of each platinum group element was constant at 1.4 g/liter. The number of cells was constant at 300 cpi$^2$.

We claim:

1. A process for producing an exhaust gas purifying catalyst by depositing a slurry containing at least one platinum-group element, active alumina, cerium oxide, a barium compound and a zirconium compound as catalyst ingredients on a monolithic support and calcining the support having the catalyst ingredient deposited thereon, which comprises
   (a) a step of preparing active alumina containing the platinum-group element,
   (b) a step of preparing a slurry containing the platinum-group element and active alumina from step (a), cerium oxide, the barium compound and the zirconium compound, and
   (c) a step of depositing the slurry on the monolithic support, followed by calcination.

2. The process set forth in claim 1 wherein the monolithic support is of a honeycomb-like or three-dimensional network structure.

3. The process set forth in claim 1 or 2 wherein the monolithic support is composed of cordierite.

4. The process set forth in claim 1 or 2 wherein the monolithic support is composed of a refractory metal.

5. The process set forth in claim 1 wherein the platinum-group element consists of platinum and rhodium.

6. The process set forth in claim 1 wherein the weight of platinum is 0.1 to 10 g per liter of the finished catalyst.

7. The process set forth in claim 1 wherein the weight of rhodium is 0.02 to 2 g per liter of the finished catalyst.

8. The process set forth in claim 1 wherein the weight of active alumina is 30 to 200 g per liter of the finished catalyst.

9. The process set forth in claim 1 wherein the weight of cerium oxide is 10 to 150 g per liter of the finished catalyst.

10. The process set forth in claim 1 wherein the barium compound is barium hydroxide.

11. The process set forth in claim 1 wherein the weight of the barium compound is 0.1 to 20 g calculated as barium oxide per liter of the finished catalyst.

12. The process set forth in claim 1 wherein the zirconium compound is zirconyl acetate.

13. The process set forth in claim 1 wherein the weight of the zirconium compound is 0.1 to 30 g calculated as zirconyl acetate per liter of the finished catalyst.

* * * * *